Figure 1:
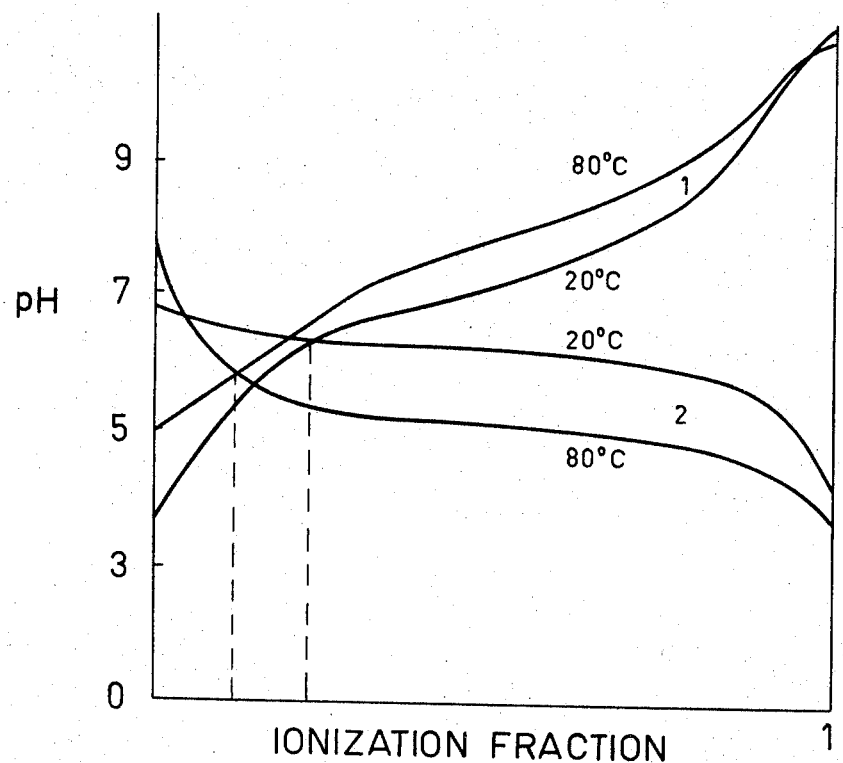
Figure 2:
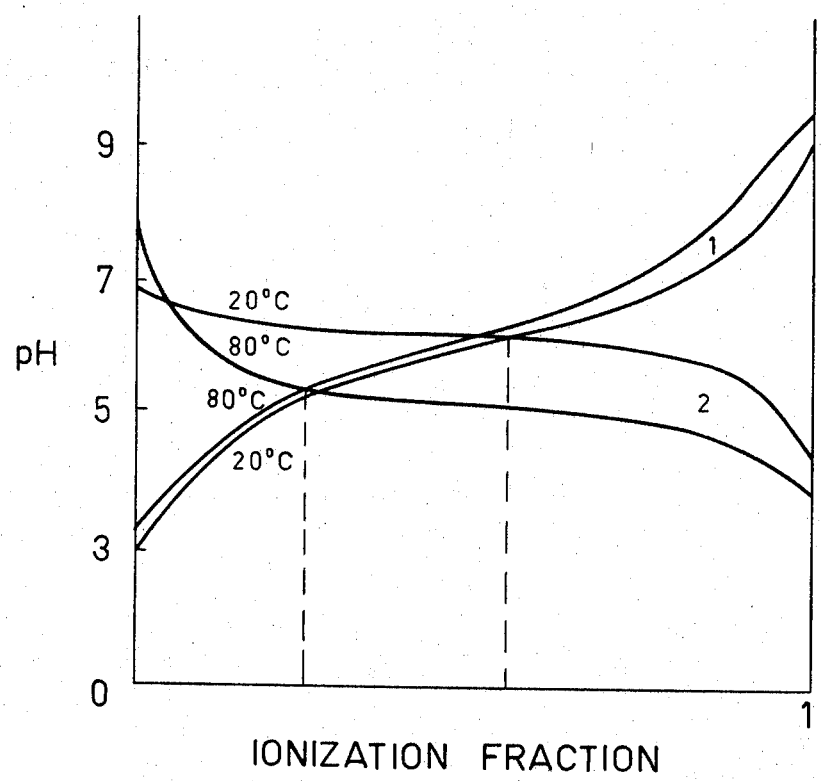
Figure 3:
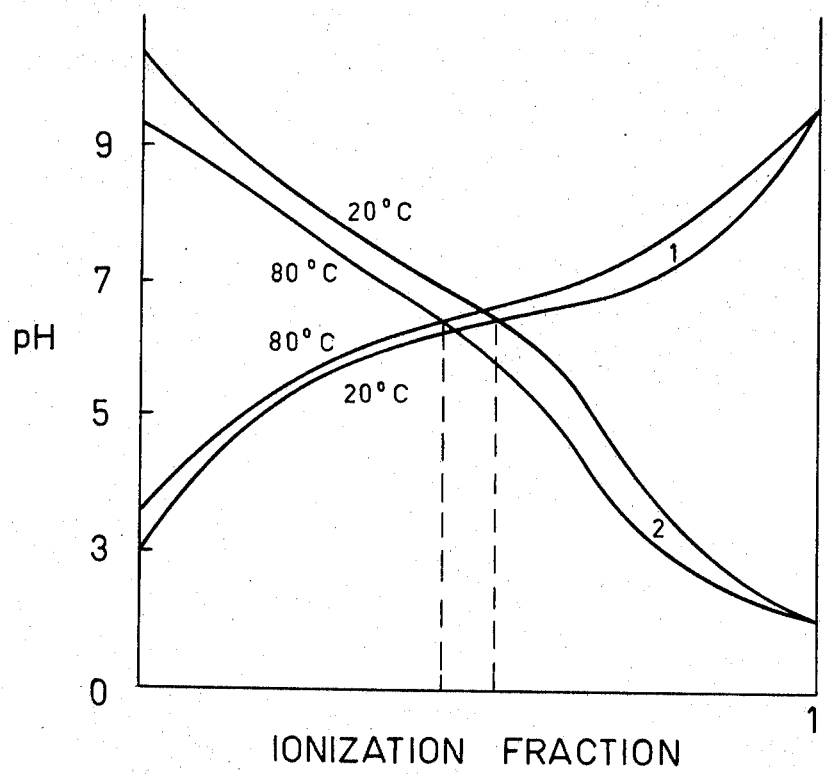
Figure 4:
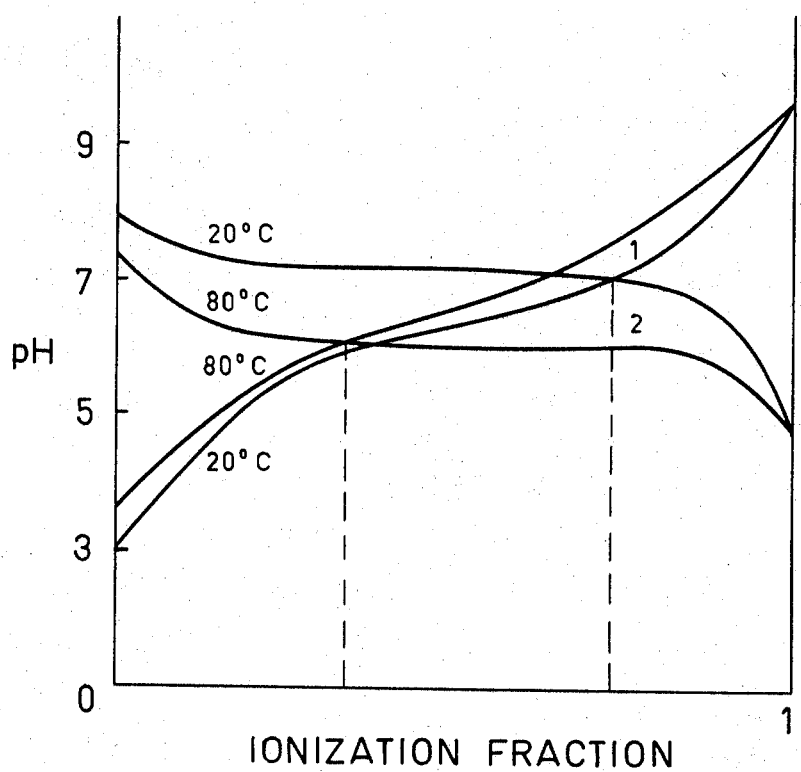

1. "Amberlite IRC-50"
2. "De-Acidite G"
   (1760 ppm saline)

1. 2.5% Crosslinked poly(acrylic acid)
2. "De-Acidite G"
   (1760 ppm saline)

1. "Amberlite IRC-50"
2. "De-Acidite M"
(29,300 ppm saline)

1. "Amberlite IRC-50"
2. "De-Acidite G"

(29,300 ppm saline)

"De-Acidite G" and "Zeo-Karb 226" in 1760 ppm saline

1. "De-Acidite G" titration curve at 20°C
2. "Zeo-Karb 226" titration curve at 20°C
3. Constructed equilibrium diagram for mixed bed at 20°C "De-Acidite G" and "Zeo-Karb 226"
in 1760 ppm saline

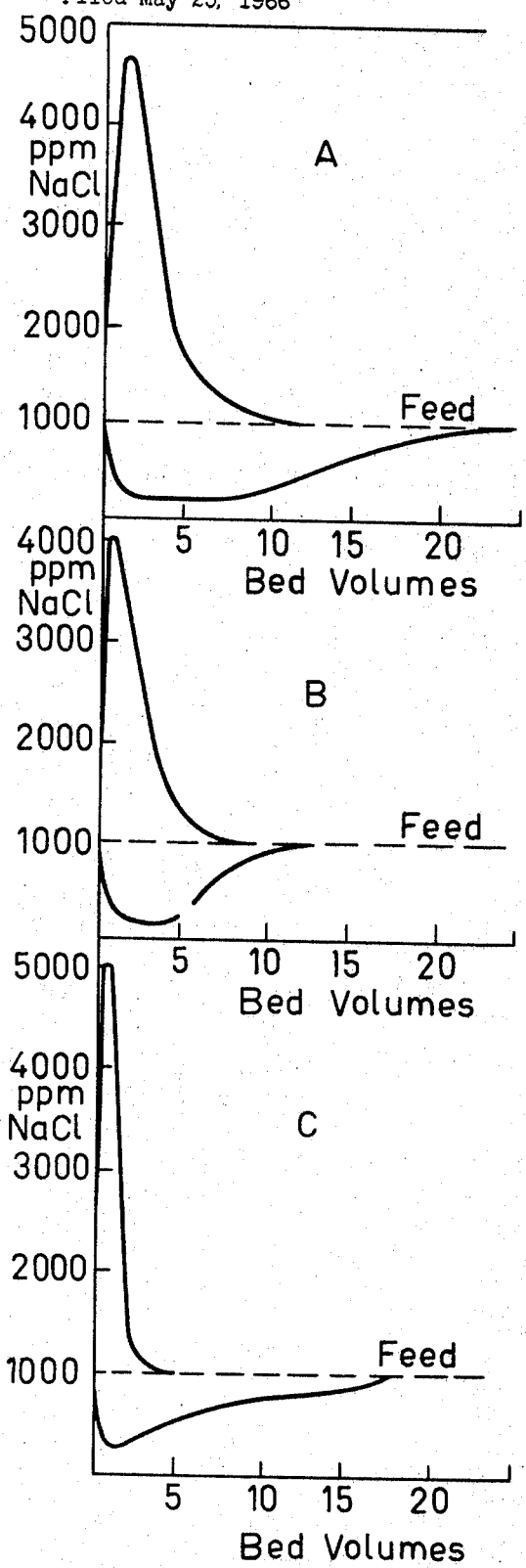
FIG. 15
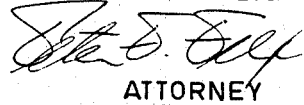

United States Patent Office 3,425,937
Patented Feb. 4, 1969

3,425,937
DEMINERALIZATION OF WATER
Donald Eric Weiss, 34 Lake Road, Blackburn, Victoria, Australia, and Brian Alfred Bolto, 29 Somers St., Mitcham, Victoria, Australia
Continuation-in-part of application Ser. No. 349,976, Mar. 6, 1964. This application May 25, 1966, Ser. No. 552,887
U.S. Cl. 210—32        1 Claim
Int. Cl. C02b *1/16, 1/42, 1/56*

This application is a continuation-in-part of applicants' copending application Ser. No. 349,976, filed Mar. 6, 1964, now abandoned.

This invention relates to the demineralization of water by ion-exchange resins, and is particularly concerned with improvements and modifications of the techniques described in our co-pending application No. 349,976, filed Mar. 6, 1964, now abandoned (hereinafter referred to as "our prior specification").

Our prior specification deals with the principles and techniques of water demineralization using "mixed-bed" resins, specifically mixed-beds of weak acid and weak base resins, and describes a method for the thermal regeneration of such resin beds by elution with hot water or saline solutions, as described in our prior specification, the successful application of this method to mixed-bed weak acid and weak base resins used in water demineralization, depends on the matching of certain characteristics of the individual weak acid and weak base resins used in the bed.

Certain commercially available types of weakly basic resins are characterized in that the active groups are amino groups (mixed primary, secondary, tertiary and quaternary) having different basicities, which for the purposes of this discussion are hereinafter referred to as "heterofunctional." These heterofunctional resins, combining in their structure amino groups of different basicities, are very simply and usefully characterized for the purpose of understanding this invention by a titration curve which plots against an added volume of neutralizing acid a function of the hydrogen-ion concentration (pH) of a solution of a known and constant ionic strength which is in equilibrium with a quantity of the weak base ion-exchange resin. For purposes of comparison, the amount of acid added is reckoned as a fraction (ionization fraction) of the total ion-exchange capacity of the resin. For a heterofunctional resin, the pH falls continuously as the titration proceeds, so that the curve everywhere has a distinct gradient of varying magnitude.

When, however, certain weakly basic resins which are preferred for the purpose of this invention are titrated in similar fashion, the resultant titration curve is characterized by a distinct plateau, which shows an almost steady pH value over a major part of the titration. Furthermore, if the neutralization is carried out at an elevated temperature (such as, for example, 80° C.) the titration curve moves to a more acid pH value, but retains the plateau structure. In resins of this type (which we shall refer to as homofunctional resins) it is believed that the active amino groups are essentially all of the same chemical nature and in essentially the same relationship with the resin skeleton.

It is also possible to define the properties of a weak-acid ion-exchange resin by a titration curve, which in this case plots against an added volume of neutralizing alkali a function of the hydrogen-ion concentration (pH) of a solution of a known and constant ionic strength which is in equilibrium with a quantity of the weak-acid ion-exchange resin. For purposes of comparison, the amount of alkali added is reckoned as a fraction (ionization fraction) of the total ion-exchange capacity of the resin. Elevation of temperature moves the titration curve to a more alkaline position generally, although some crossing-over may take place towards the end of the titration.

The preferred form of the invention described in our prior specification provides a process for the demineralization of water by a mixed-bed of weak acid and weak base type ion-exchange resins characterized in that the mixed-bed is regenerated by eluting it with water or a saline solution at a temperature exceeding that employed during the adsorption stage, the said weak base resin having a titration curve which is distinguished by an almost steady pH value over a major portion of the titration and which is displaced to a more acid position by elevation of temperature, and the said weak acid resin having a titration curve at the temperature of the adsorption stage such that some portion of it falls within the area defined by the titration curves of the weak base resin at the temperatures of the adsorption and elution stages respectively.

For maximum efficiency, the pH of the feed water should fall within the area on the titration curve defined by the hot and cold titration curves of the weakly basic resin (corresponding to the adsorption and elution stages respectively). Also the distance between the projections on to the titer axis of the intersections of the cold titration curve of the acid resin with that of the cold titration curve of the base resin under the adsorption conditions, and of the hot titration curve of the acid resin with that of the hot titration curve of the base resin under the elution conditions, when the two sets of curves are superimposed, should be as large as possible. In addition, the shift of the weak base titration curve should be as large as possible for a given increase in temperature of operation—this will give the largest effect for a given energy input, and allow best use of low grade heat sources.

The present invention is concerned with techniques which permit better matching, and hence overlap (as hereinafter defined), of the resin titration curves, i.e. a greater distance between the said projections on to the titer axis, thereby enabling greater salt uptakes to be achieved with a given pair of resins.

In our prior specification, it is shown how the effective capacity of a resin pair (i.e. the difference between the salt uptake of the mixed resin bed from a cold and a hot saline solution) can be evaluated experimentally by equilibrating the mixed resins with a saline solution at the respective temperatures of the adsorption and elution stages. All of the mixtures thus studied were mixturees of weak acid and weak base resins in a 1:1 molar ratio and no attempt was made to adjust the pH of the saline solution at equilibrium.

The term "overlap" as used herein means the distance between the projections on to the titer axis of the intersections of the cold titration curve of the acid resin with the cold titration curve of the base resin, under the absorption conditions, and of the hot titration curve of the acid resin with the hot titration curve of the base resin, under the eluation conditions, when the two sets of curves are superimposed.

It has now been found that the degree of overlap, i.e. the matching of the titration curves of the weak acid and weak base resins, can be improved by alteration of (a) the pH of the saline solution in equilibrium with the mixed resins and (b) the molar ratio of weak acid to weak base resins ("resin ratio") in the mixture. It is thus possible to achieve a greater effective capacity for a given resin pair by adjustment of these factors.

These effects can be explained by a consideration of the three alternative procedures which we have now used to study the adsorption of salt by a pair of acid and base resins in a salt solution, i.e. (1) Equimolar mixtures of the resins in the undissociated form may be added to the salt solution without any adjustment being made to the final equilibrium pH value of the solution. (2) Equimolar mixtures of the resin can be added to the solution together with acid or alkali to adjust the final equilibrium pH value to any desired value. (3) Resin rations other than unity may be used and the final equilibrium pH value may be adjusted to any desired value by the addition of acid or alkali. It will be appreciated that a fourth situation can occur, namely when a resin ratio other than unity is employed with the resins initially in the undissociated form. However, it is unlikely that such conditions would in practice result in optimum performance of the process, although they may arise fortuitously.

(1) Resin ratio of unity with no pH adjustment.—This procedure, as mentioned above, is discussed in detail in our prior specification. Briefly it can be considered as in FIGURES 1 to 4 by superimposing the titration curves of the acid and base resins at the specified temperature and equilibrium salt concentration, so that scales of the resin composition correspond. The equilibrium resin composition and pH value of the solution are shown by the point of intersection of the titration curves since this represents the resin compositions that correspond to the same pH value. Since the hydrogen ion concentration in the solution is negligible at ca. pH 4 to 10 compared with that of the ions of a 1760 p.p.m. salt solution for example, there will be one sodium ion adsorbed by the acid resin for every chloride ion adsorbed by the amine resin. Since the resin compositions were the same before adsorption, both resin compositions will change to the same extent after adsorption. The difference between the projections onto the resin composition axis of the points of intersection of the hot and cold titration curves shows the change in resin composition and pH value which occurs on heating the resin mixture in the salt solution.

The differences in the amount of salt adsorbed by equimolar mixtures of a large number of combinations of different undissociated acid and base resins at ca. 20° and 80° C. ("effective capacity") have been measured by direct experiment as described in our prior specification. They show similar trends to those indicated by the intercepts in FIGURES 1 to 4.

These examples show that the greater the overlapping of the hot and cold acid and base titration curves, the greater the effective capacity. The ideal resin combination at a specified salt concentration is therefore one in which both resins have homofunctional titration curves which overlap to the maximum extent.

It is also desirable for maximum performance that the position of the titration curves of both resins with respect to the pH axis should shift as little as possible with changes in ionic strength, since the direction of the shift reduces the effective capacity.

Figure 5:
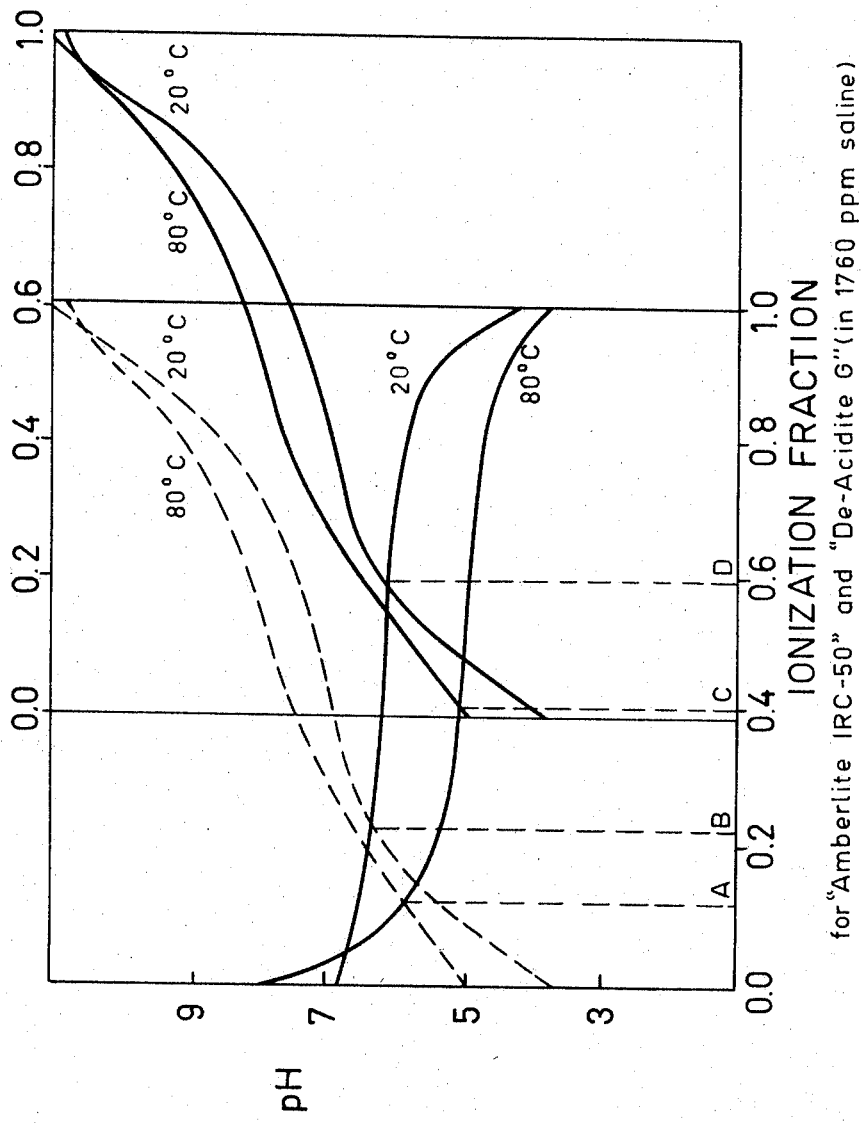

(2) Resin ratio of unity with pH adjustment.—If the resin ratio is unity, but the pH value at equilibrium is altered by the addition of acid or alkali the condition is described by the titration curves superimposed as before, but shifted with respect to each other along the composition axis such that the point of intersection is at the prescribed pH value at 20° C. Reference to FIGURE 5 will show that such a shift can have an important influence on the extent of over-lapping of the curves, since the overlap is increased from the amount AB which applies when the resins are used in the undissociated form, to the amount CD when the pH at 20° C. is adjusted to a slightly different value. Thus the pH value has a large influence on the salt adsorbed by the mixed resins, particularly when a homofunctional base resin is used in which a large composition change can occur with very little change in pH.

Figure 6:
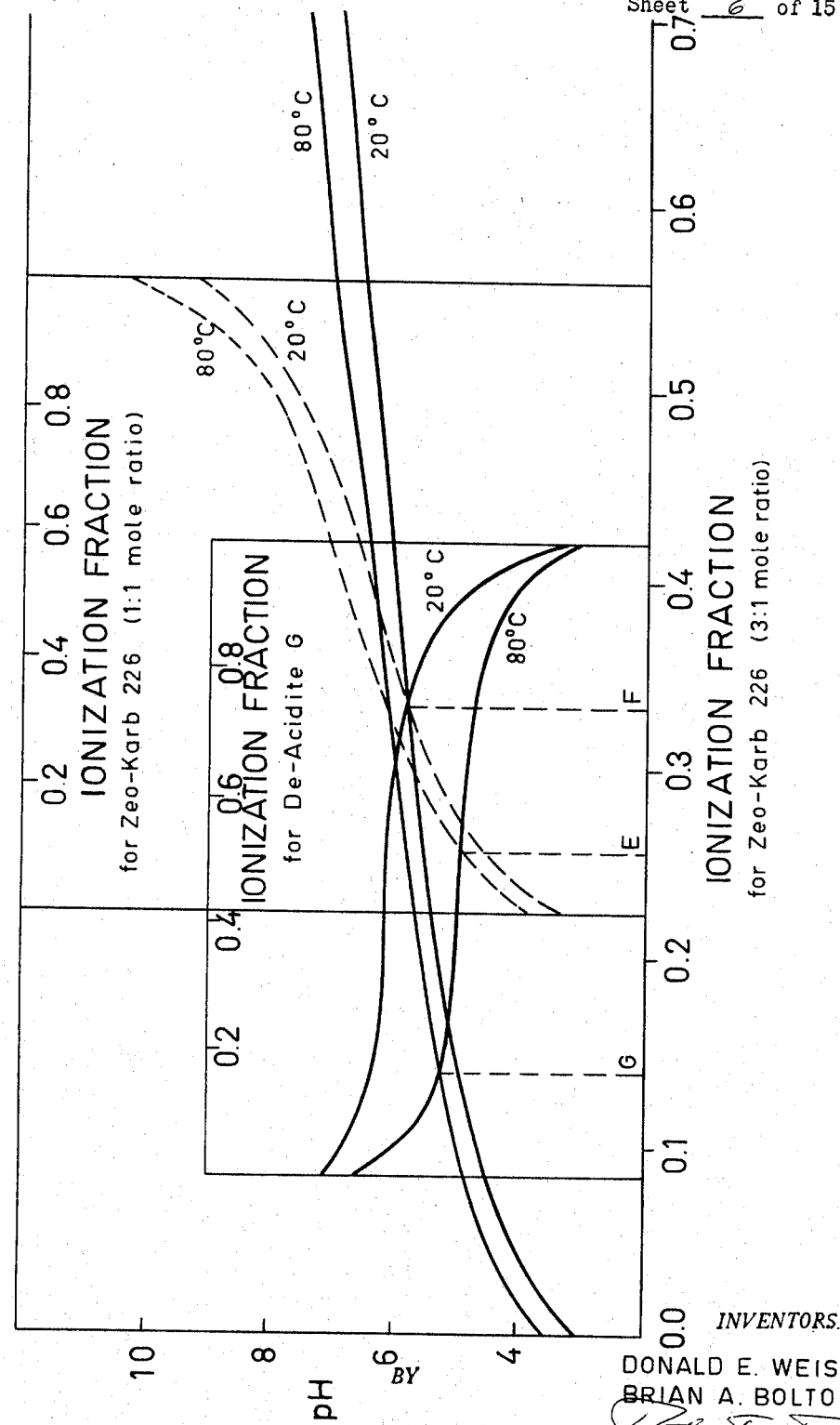

(3) Resin ratios other than unity with pH adjustment.—When the resin ratio is no longer unity and the equilibrium pH value of the adsorption stage has been adjusted by the addition of acid or alkali to any desired value, the situation can be depicted as in FIGURE 6 for a resin ratio (acid to base) of 3 by superimposing the titration curve of the acid resin over that of the base resin drawn on a composition axis only one third that of the acid resin. Since one sodium ion must be adsorbed by the acid resin for every chloride ion adsorbed by the anion resin to maintain electrical neutrality, and there are three equivalents of acid to base resin, the change in composition of the acid resin after adsorption of salt will be only one third that of the base resin on the ionisation faction scale. The relative position of the curves can be moved, as in the preceding examples, so that the intercept of the titration curves occurs at any desired pH value.

The hot and cold titration curves of an equimolar mixture of the same resins equilibrated to have the same pH value are shown also in FIGURE 6. The diagram shows that increasing the resin ration increases the overlapping of the two titration curves from EF to GF so that the salt uptake is considerably greater than for the equimolar mixture. The effect of increasing the resin ratio is therefore equivalent to using an acid resin with a flatter titration curve, and represents a practical method of improving the matching characteristics of a pair of resins.

Figure 7:
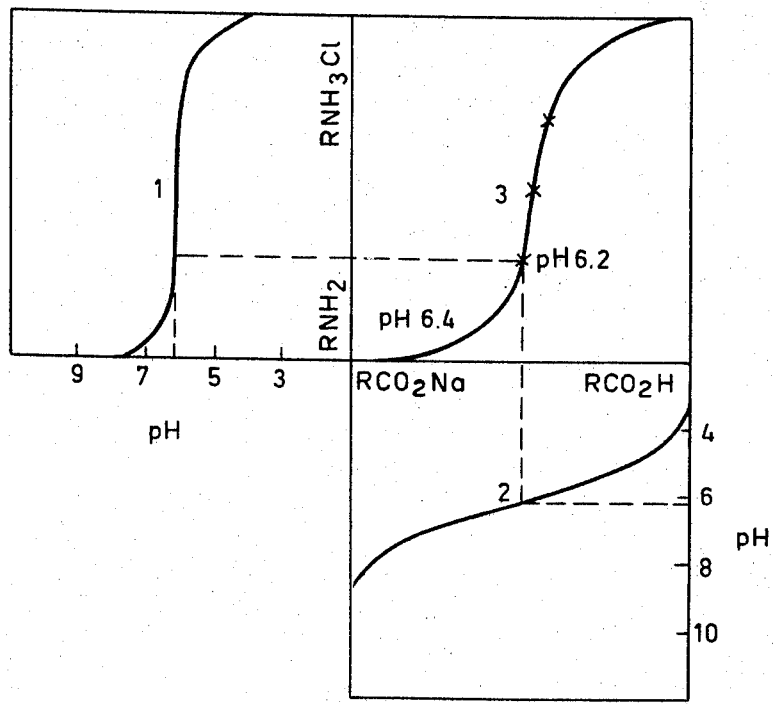

It is possible to construct an equilibrium diagram consisting of a plot of acid resin ionization versus that of the base resin at different conditions of temperature and salt concentration, by using the acid and base resin titration curves, at a specified temperature and salt concentration, as shown in FIGURE 7. This shows that the equilibrium diagram represents the resin compositions of the two resin phases at the same pH value. Thus points along the curve correspond to different pH values. The titration curves shown are those for "De-Acidite G" and "Zeo-Karb 226" in a 1760 p.p.m. salt solution at ambient temperature. The crosses on the line derived from the titration curves are obtained from direct experimental determination of the resin compositions of the mixed-bed. The excellent agreement validates the method and shows that the two resins behave independently of each other when mixed. Analogous curves can be derived from hot titration curve data, but are less exact since the ionisation fraction for the amine curves does not coincide exactly with the acid fraction.

Figure 8:
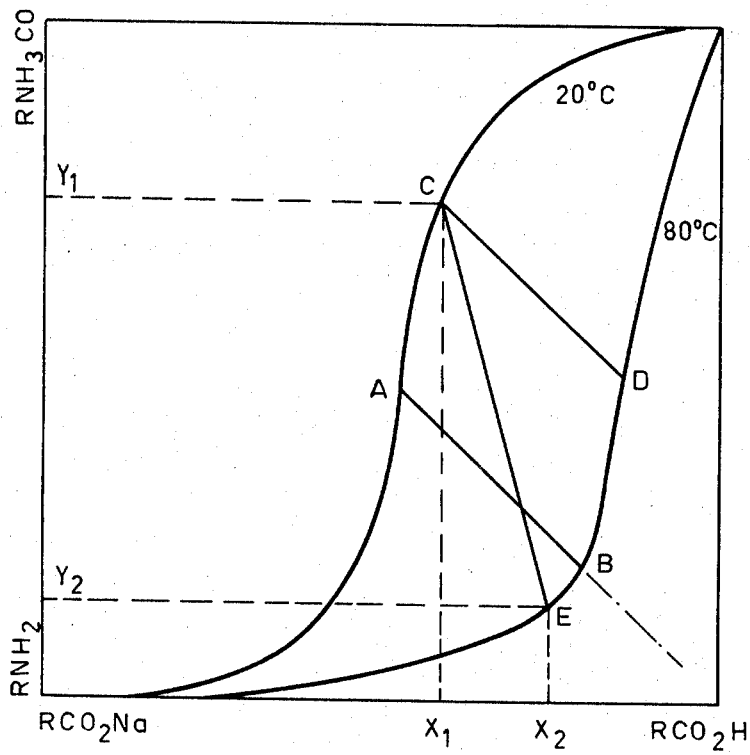

Equilibrium curves derived from the hot and cold titration data can be used in the following manner to predict approximate effective capacities for a variety of different conditions. FIGURE 8 shows such a pair of hot and cold equilibrium curves constructed from the titration curves of "De-Acidite G" and "Zero-Karb 226" in 1760 p.p.m. saline. The effective capacity of an equimolar mixture of the undissociated resins may be found by drawing a line AB with a slope of unity through the point on the resin composition scales corresponding to a value of zero for the ionization faction. The slope is unity since, for a resin ratio of unity, the change in composition of both resins on heating the cold mixed-bed must be the same in order to maintain electrical neutrality. The point of intersection of this line with the cold equilibrium curve (A) corresponds to the pH value of the intercept of the cold titration curves when superimposed on a common resin composition scale. The point of intersection of the line with the hot equilibrium curve (B) gives the composition of the resins when heated to 80° C. The difference in resin compositions corresponding to points A and B therefore gives the effective capacity. The changes in resin composition which occur when acid or alkali is added to the same resin mixture can be described by parallel lines such as CD, which intersect the cold equilibrium curve at the appropriate pH value.

If the resin ratio is changed from unity, the effective capacity can be determined from lines such as CE with a slope corresponding to the resin ratio and intersecting the cold equilibrium curve at the desired pH value. For example, if there are three equivalents of acid resin for one of base resin, the change in composition of the acid resin following the adsorption of sodium ions is given by the projection $(x_1-x_2)$ of the line CE, and will be only one third of the change in composition of the base resin ($y_1-y_2$) as a result of the adsorption of an equivalent amount of chloride ions. By such a graphical procedure it is thus possible to calculate from the relevant titration curve data the approximate effective capacity for different resin ratios of the mixed-bed in equilibrium with solutions having a variety of pH values.

Figure 9:
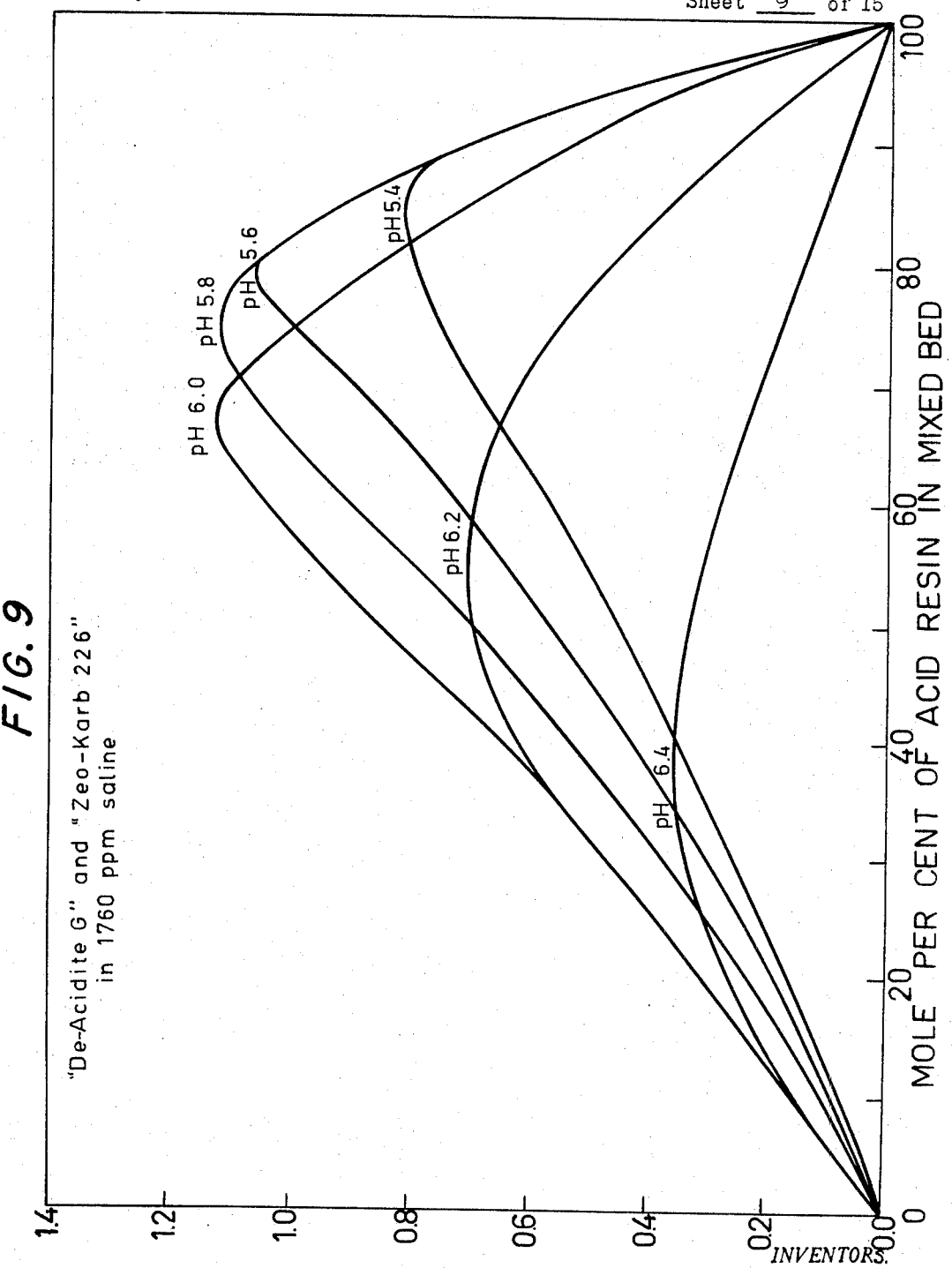

The predicted effect of resin ratio and pH on the effective capacity of mixtures of "De-Acidite G" and "Zeo-Karb 226" in 1760 p.p.m. saline is shown in FIGURE 9, derived as described above from the titration curves. It has been shown in FIGURE 6 that at appropriate pH values there is a greater overlapping of the titration curves as the resin ratio increases. However, increasing the resin ratio also increases the weight of the resins per unit of base resin capacity, so that the effective capacity passes through a maximum when expressed on a unit of weight basis, as illustrated in FIGURE 9. The curves show that at each pH value there is an optimum resin ratio for maximum effective capacity, and that the effective capacity varies markedly with changes in the pH value. A different set of curves is obtained for each salt concentration studied.

By estimating the effective capacties at various pH values, resin ratios, and salt concentrations for a variety of resin mixtures it is possible to select the optimum resin pair from the many resins available. Because of the inaccuracies inherent in the determination of the 80° C. data, the results obtained cannot be taken as absolute. Nevertheless, since the errors are common to all the resin systems, the predictions are of great value as a means of scanning a wide range of resins for the selection of a pair which will result in maximum performance in the operation of the process.

Figure 10:
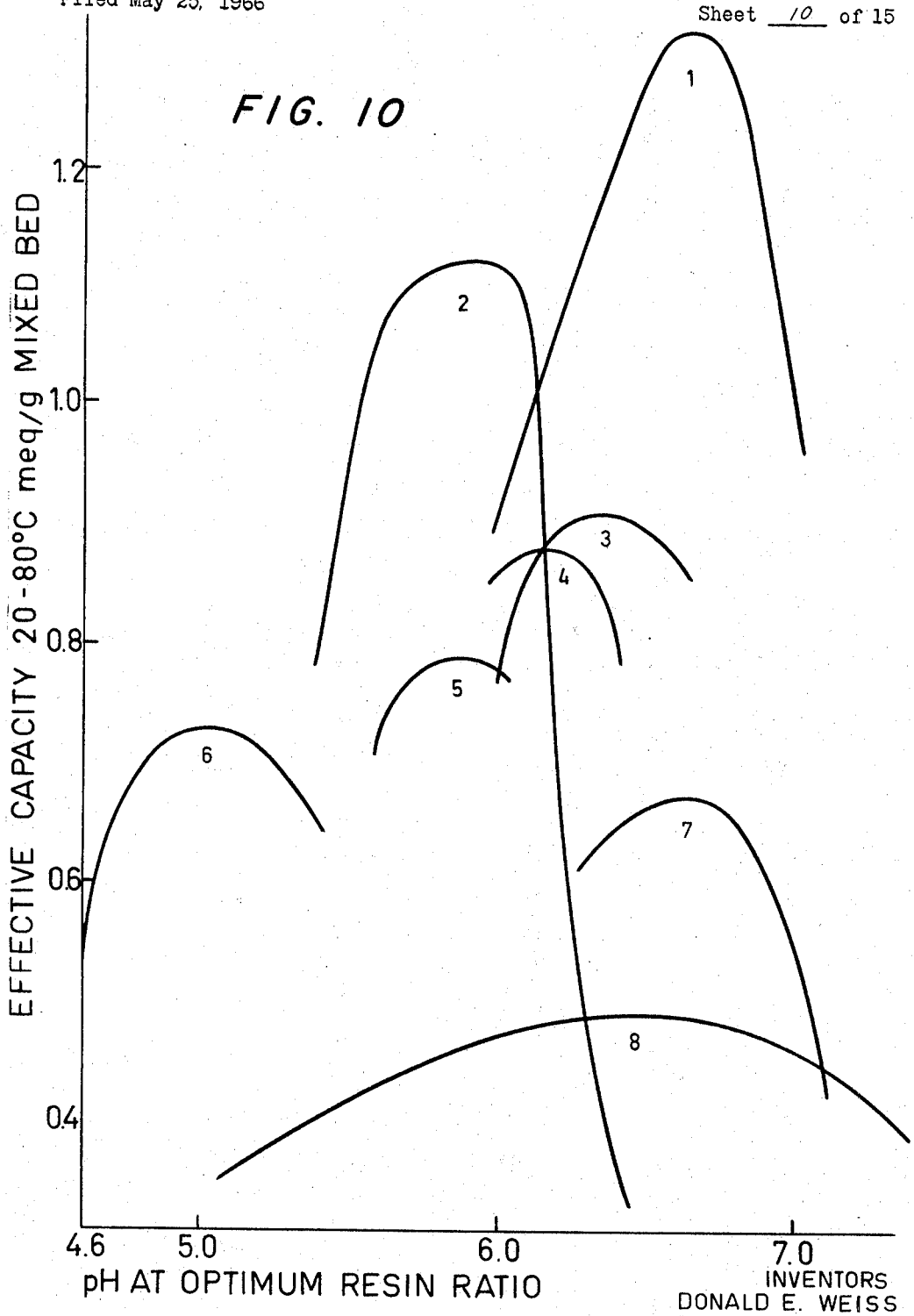

FIGURE 10 shows the predicted effective capacity (20–80° C.) versus pH at optimum resin ratio for mixed-beds of various amine resins with the weak acid resin "Zeo-Karb 226" in 1760 p.p.m. saline. The amine resins corresponding to the numbered curves are listed below; optimum resin ratio (acid to base) at maximum effective capacity is shown in parenthesis.

(1) 3–5% crosslinked polyvinylbenzylethylamine (1.9).
(2) "De-Acidite G" containing 2.6% quaternary ammonium groups (2.5).
(3) 7–9% crosslinked polyvinylbenzyldimethylamine (1.9).
(4) "Amberlite IRA–93" (2.5).
(5) As in 2, but with "Amberlite IRC–50" as the acid resin (4.0).
(6) 7–9% crosslinked polyvinylbenzyldipropylamine (4.0).
(7) "De-Acidite G" containing 26% quaternary ammoinum groups (1.5).
(8) "De-Acidite M" (1.0).

Figure 11:
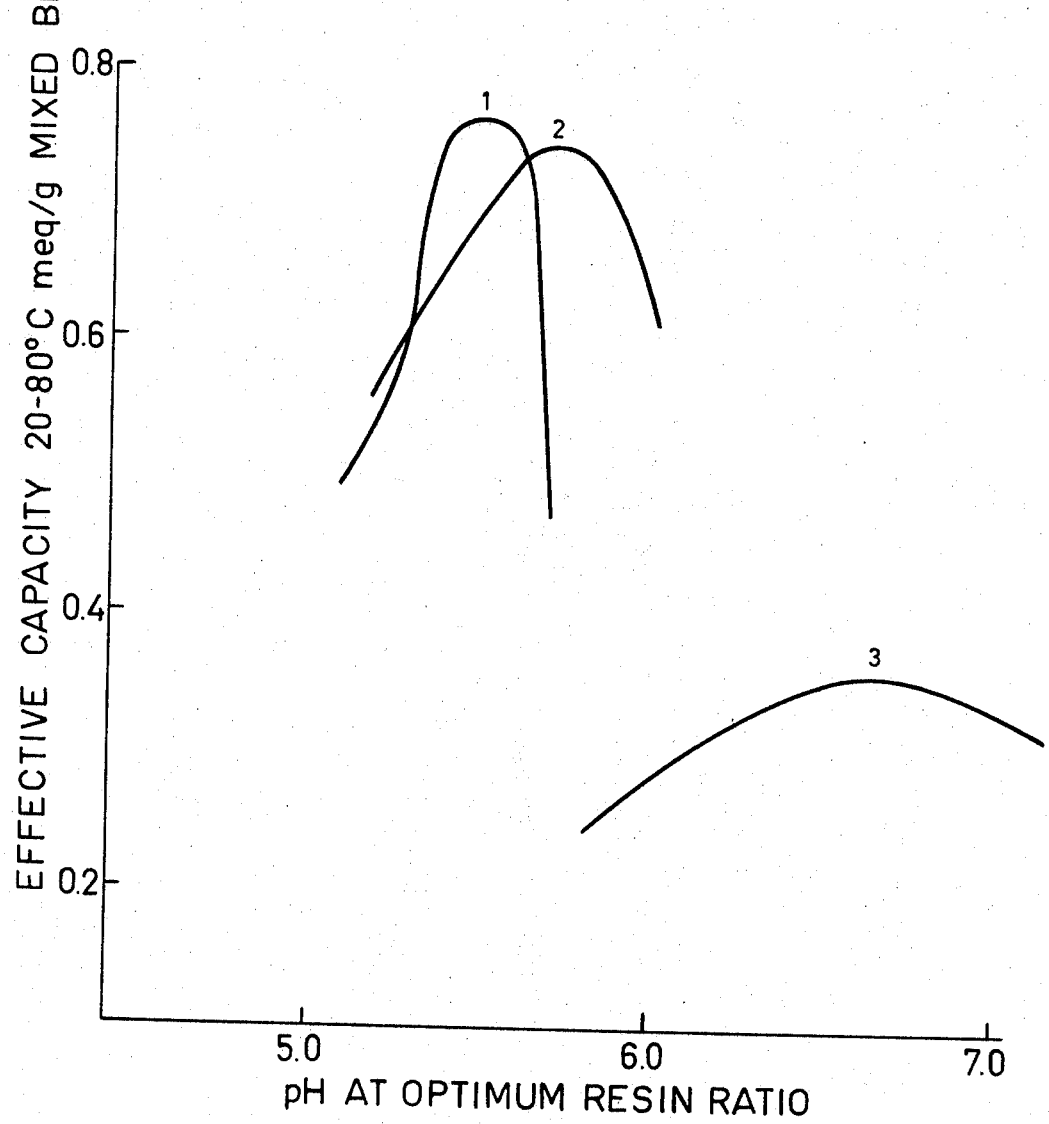

FIGURE 11 shows the predicted effective capacity (20–80° C.) versus pH at optimum resin ratio for mixed-beds of various amine resins with "Zeo-Karb 226" in 500 p.p.m. saline. The amine resins corresponding to the numbered curves are listed below; optimum resin ratio (acid to base) at maximum effective capacity is shown in parenthesis.

(1) "De-Acidite G" containing 2.6% quaternary ammonium groups (3.3).
(2) "Amberlite IRA–93" (2.5).
(3) "De-Acidite M" (1.0).

The curves show that resins differ widely in their performance. The effective capacity is critically dependent on pH when the amine resin is homofunctional, but the dependence is less critical for the heterofunctional resin "De-Acidite M." The pH values corresponding to maximum effective capacities are shifted slightly by a change in salt concentration.

The results show clearly that "De-Acidite G" and "Amberlite IRA–93" are the best commercial amine resins for use with "Zeo-Karb 226." Even higher effective capacities are given by an experimental crosslinked poly(vinylbenzylethylamine) resin in a 1760 p.p.m. salt solution. The data also confirm the superiority of the poly(acrylic acid) resin "Zeo-Karb 226" ("Amberlite XE–232" is very similar) over that of the poly(methacrylic acid) resin "Amberlite IRC–50." It can be seen from FIGURE 10 that increasing the quaternary ammonium content of "De-Acidite G" from 2.6% to 26% reduces its performance considerably.

Figure 12:
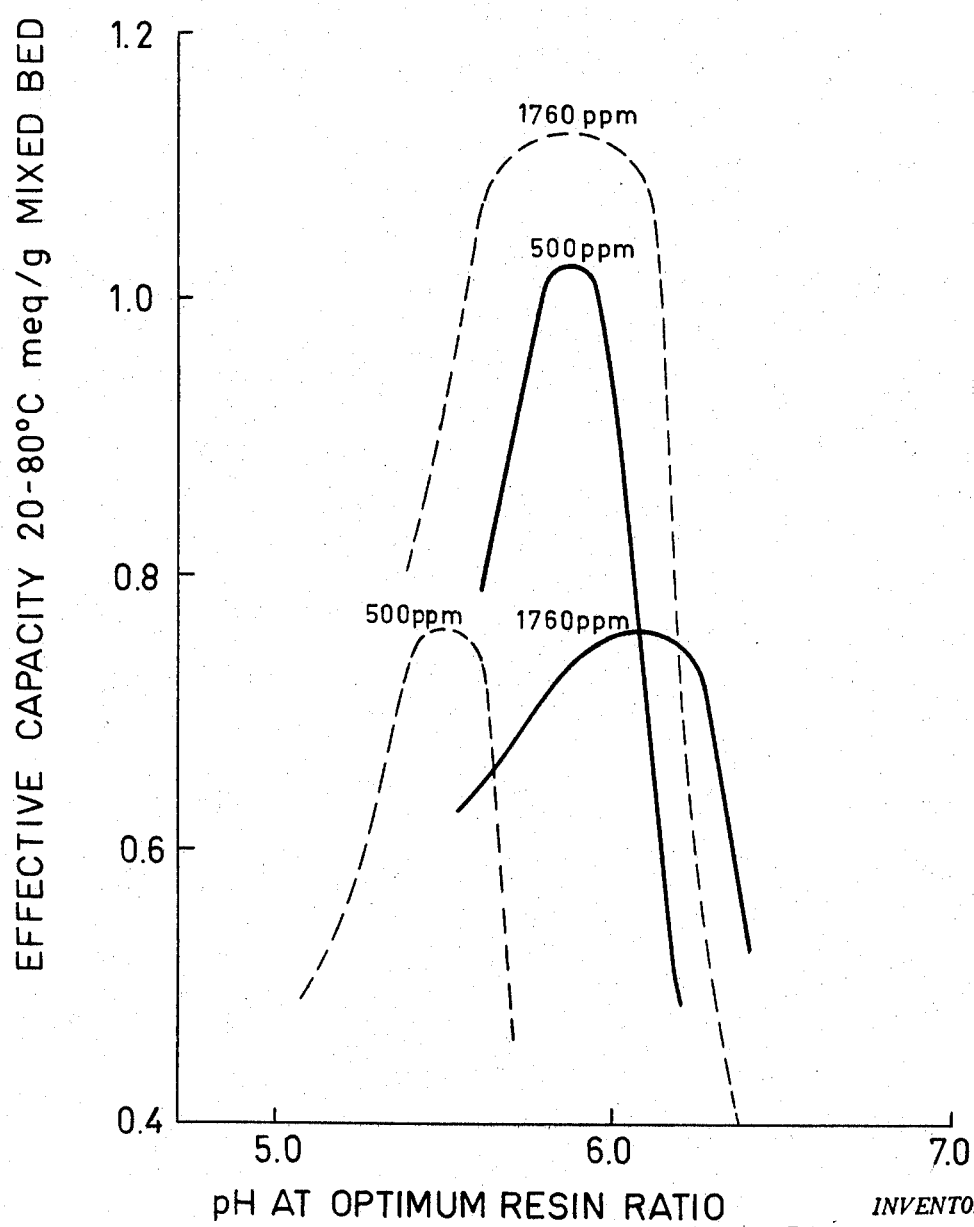

A similar analysis is given in FIGURE 12 for the titration curves of "Zeo-Karb 226" and "De-Acidite G" at ca. 20° and 80° C. in different solutions containing 500 p.p.m. and 1760 p.p.m. of sodium chloride (dashed curves) or calcium sulphate (solid curves). The curves show that divalent ions raise the pH values for maximum effective capacities to slightly higher values, and that whereas the maximum effective capacity is greater in the presence of monovalent rather than divalent ions at 1760 p.p.m., the converse is true at 500 p.p.m.

Figure 13:
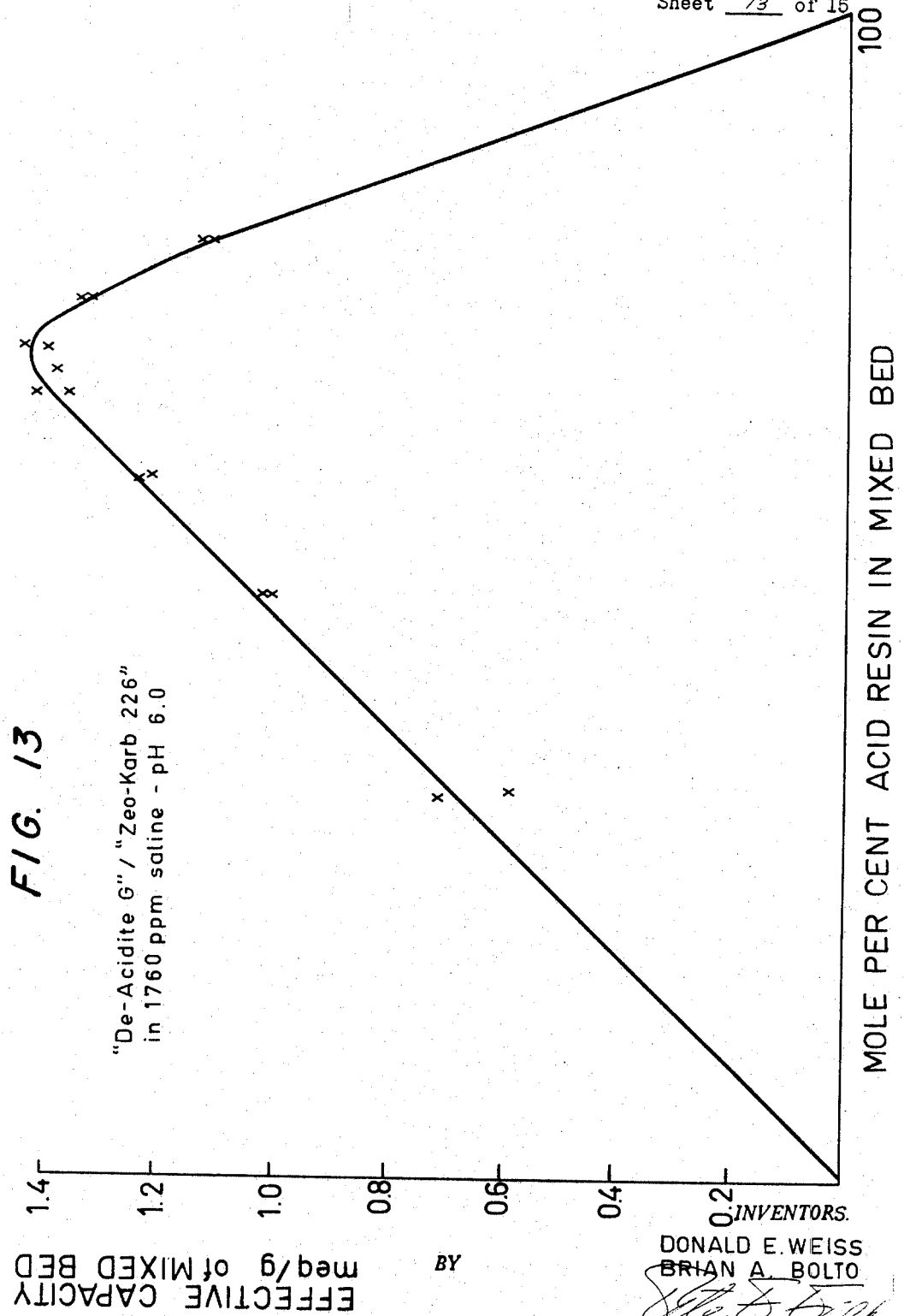

Experimental results for a mixed-bed of "De-Acidite G" and "Zeo-Karb 226" in 0.03 M saline confirm that at fixed pH level for the adsorption stage the effective capacity varies with change of resin ratio. FIGURE 13 shows that at pH 6.0 the effective capacity passes through a maximum when the resin ratio is 2.4 (acid to base).

Figure 14:
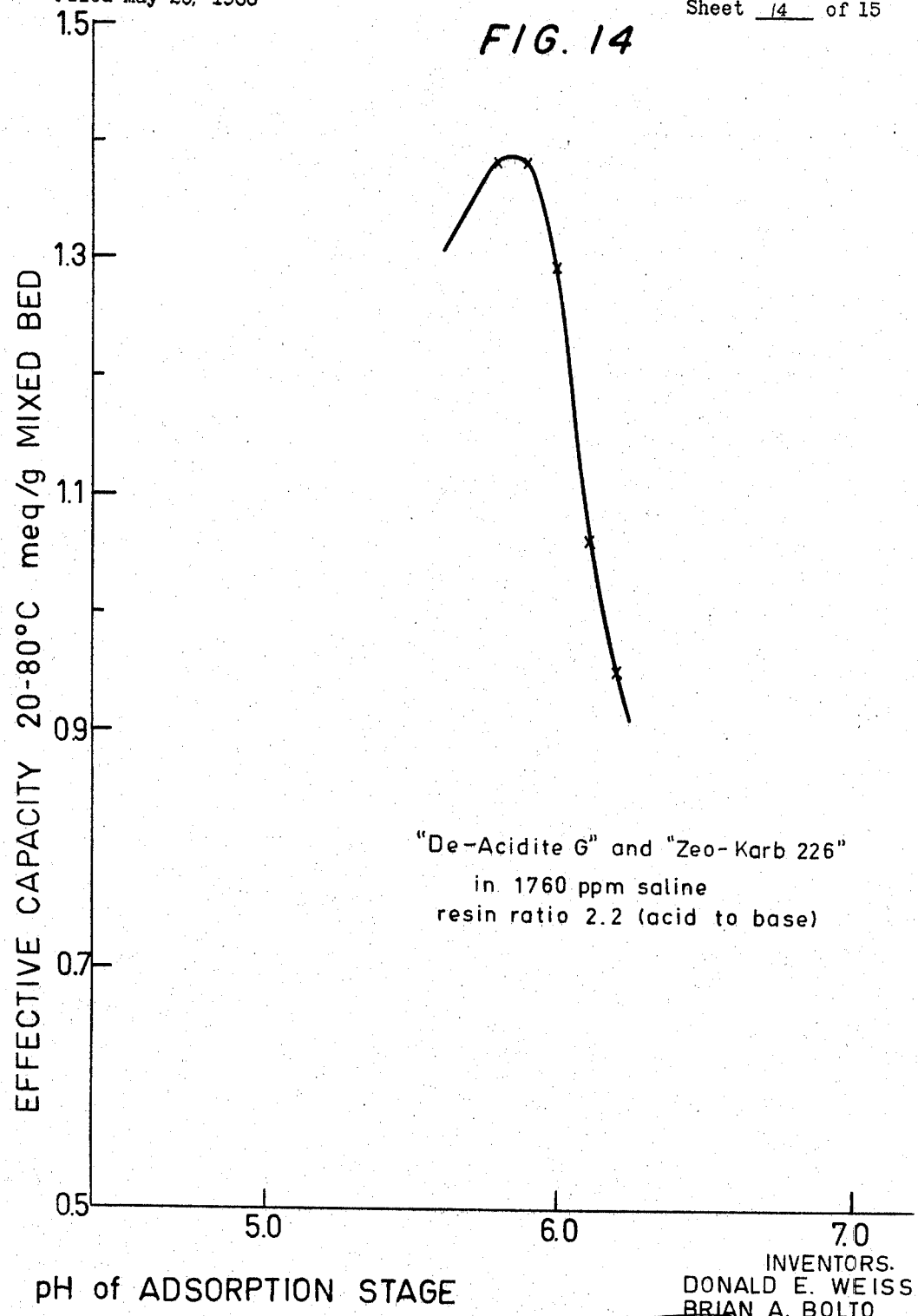

When the resin ratio is maintained at 2.2 (acid to base) in the same system, the experimentally determined effective capacity varies with the pH of the adsorption stage, passing through a maximum when the equilibrium pH lies between 5.8 and 5.9, as shown in FIGURE 14.

While satisfactory approximations of the effective capacity for single stage operation of the process can be made from titration curve data, predicting the optimum conditions for multistage operation is extremely difficult. At best a rough guide can be obtained which must be refined by experiment. It is possible to illustrate the importance of pH in the multistage process by column experiments. "Zeo-Kark 226" and "De-Acidite G" of particle size less than 200 mesh and a resin ratio of 2.5 (acid to base) were employed. With a feed and regenerant of 1000 p.p.m. saline the effective capacity of the column decreased markedly when the pH of the bed before adsorption was raised or lowered by about 0.5 of a unit from the value of 5.7, as shown in FIGURE 15 and Table 1.

TABLE 1

| Series | pH before adsorption [1] | pH of adsorption trough | Adsorption minimum, p.p.m. | Regenerant maximum, p.p.m. | Effective capacity (20 to 80° C.) of column | |
|---|---|---|---|---|---|---|
| | | | | | 2nd adsorption, meg./ml. | 2nd regeneration, meg./ml. |
| A | 5.7 | 5.8–5.5 | 230 | 4,800 | 0.20 | 0.20 |
| B | 5.2 | 5.1–4.6 | 190 | 4,100 | 0.12 | 0.12 |
| C | 6.4 | 6.0–5.8 | 275 | 5,000 | 0.10 | 0.10 |

[1] A suspension of the resins in feed water was adjusted to this pH value by addition of acid before filling the column with resin.

In the demineralization of natural waters, which contain a variety of different ions, the situation is much more complicated than has been described for synthetic saline solutions. Because of the variation of the level of the titration curves of the acid and base resins with salt concentration, and of the dependence of the variation on the type of ion, whether mono- or di-valent, it will be necessary to determine the titration curves of the resins in the presence of the natural water. The data obtained can then be used to predict the optimum resin ratio and adsorption pH as before.

The foregoing description has indicated the theoretical and practical considerations on which our invention is based. Accordingly one aspect of our invention provides a process for the demineralization of water by a mixed bed of weak acid and weak base type ion-exchange resins wherein the overlap (as hereinbefore defined) of the acid and base titration curves is maximised by adjustment of the pH of the water in equilibrium with the resin bed in the absorption, or by adjustment of the ratio of the acid and base resins, or both.

It is to be understood that the invention includes all modifications which can be made to the process described which fall within the spirit and scope of the invention as broadly stated above.

What is claimed is:
1. In a process for the demineralization of water using a mixed bed of ion-exchange resins of the weak electrolyte type in which the mixed resin bed comprises a weak base resin and a weak acid resin and is regenerated by elution with water or saline aqueous solutions at a temperature exceeding that employed in the adsorption stage and in which the weak base resin has a titration curve which is displaced to a more acid position by elevation of temperature and the weak acid resin has a titration curve at the temperature of the adsorption stage such that some portion of it falls within the area defined by the titration curves of the weak base resin at the temperatures, respectively, of the adsorption and elution stages, the improvement which comprises adjusting the pH of the water in equilibrium with the resin bed during adsorption and choosing a ratio of acid resin to base resin such as to maximize the overlap of the acid and base titration curves.

References Cited
UNITED STATES PATENTS

| | | | |
|---|---|---|---|
| 2,776,258 | 1/1957 | Gilliland | 210—32 X |
| 2,985,589 | 5/1961 | Broughton et al. | 210—34 |
| 3,111,485 | 11/1963 | Kunin | 210—32 |
| 3,203,873 | 8/1965 | Wirth | 210—34 X |
| 3,231,492 | 1/1966 | Stine et al. | 210—34 X |
| 3,250,705 | 5/1966 | Levendusky | 210—37 X |
| 3,293,175 | 12/1966 | Popper et al. | 210—32 |
| 3,351,549 | 11/1967 | Bloch | 210—24 |

SAMIH N. ZAHARNA, *Primary Examiner.*

C. M. DITLOW, *Assistant Examiner.*

U.S. Cl. X.R.

210—37, 38